US011349819B2

(12) United States Patent
Meehan et al.

(10) Patent No.: US 11,349,819 B2
(45) Date of Patent: May 31, 2022

(54) METHOD AND SYSTEM FOR DIGITAL RIGHTS MANAGEMENT OF DOCUMENTS

(71) Applicant: Keyavi Data Corp, Las Vegas, NV (US)

(72) Inventors: Patrick Carson Meehan, Las Vegas, NV (US); Zachary Wisenbaker Price, Seattle, WA (US); Raymond Joseph Zambroski, Jr., Seattle, WA (US); William Henry Frenchu, Seattle, WA (US); Shawn Patrick Hickey, Seattle, WA (US); Jesse Lee White, Bellevue, WA (US); Anthony Allen Mohr, Bellevue, WA (US); Jeremy Wayne Gomsrud, Bellevue, WA (US)

(73) Assignee: Keyavi Data Corp, Las Vegas, NV (US)

( * ) Notice: Subject to any disclaimer, the term of this patent is extended or adjusted under 35 U.S.C. 154(b) by 0 days.

(21) Appl. No.: 17/011,764

(22) Filed: Sep. 3, 2020

(65) Prior Publication Data

US 2020/0403981 A1    Dec. 24, 2020

Related U.S. Application Data

(63) Continuation of application No. 16/446,060, filed on Jun. 19, 2019, now abandoned, which is a
(Continued)

(51) Int. Cl.
*H04L 29/06* (2006.01)
*G06F 21/10* (2013.01)
(Continued)

(52) U.S. Cl.
CPC .......... *H04L 63/0435* (2013.01); *G06F 21/10* (2013.01); *H04L 9/0861* (2013.01);
(Continued)

(58) Field of Classification Search
CPC ... H04L 9/0861; H04L 63/0435; G06F 21/10; G06F 2221/2137
See application file for complete search history.

(56) References Cited

U.S. PATENT DOCUMENTS

| 4,027,243 A | 5/1977 | Stackhouse et al. |
| 4,393,269 A | 7/1983 | Konheim et al. |
| (Continued) | | |

FOREIGN PATENT DOCUMENTS

| EP | 0248403 B1 | 4/1994 |
| EP | 0590861 A2 | 4/1994 |
| (Continued) | | |

OTHER PUBLICATIONS

Ford et al., "A Key Distribution Method for Object-Based Protection", ACM, Jan. 1, 1994, 5 pages.
(Continued)

*Primary Examiner* — Ellen Tran
(74) *Attorney, Agent, or Firm* — Holland & Hart LLP

(57) ABSTRACT

A method and system for transmission of digital content via e-mail with point of use digital rights management is disclosed. The secured access rights to the digital content may be customized for individual recipients by the sender, and may evolve over time. The access rights are enforced according to a time-dependent scheme. A key server is used to arbitrate session keys for the encrypted content, eliminating the requirement to exchange public keys prior to transmission of the digital content. During the entire process of transmitting and receiving e-mail messages and documents, the exchange of cryptographic keys remains totally transparent to the users of the system. Additionally, electronic documents may be digitally signed with authentication of the signature.

14 Claims, 12 Drawing Sheets

Related U.S. Application Data continuation of application No. 15/852,175, filed on Dec. 22, 2017, now Pat. No. 10,375,039, which is a continuation of application No. 14/755,622, filed on Jun. 30, 2015, now Pat. No. 9,871,773, which is a continuation of application No. 14/162,979, filed on Jan. 24, 2014, now Pat. No. 9,094,215, which is a continuation of application No. 13/538,637, filed on Jun. 29, 2012, now Pat. No. 8,677,126, which is a continuation of application No. 11/237,564, filed on Sep. 28, 2005, now Pat. No. 8,239,682.

(51) Int. Cl.
*H04L 9/08* (2006.01)
*H04L 9/32* (2006.01)

(52) U.S. Cl.
CPC .......... *H04L 9/3247* (2013.01); *H04L 9/3263* (2013.01); *H04L 63/061* (2013.01); *G06F 2221/2101* (2013.01); *G06F 2221/2137* (2013.01)

(56) References Cited

U.S. PATENT DOCUMENTS

| | | |
|---|---|---|
| 4,477,809 A | 10/1984 | Bose |
| 4,484,355 A | 11/1984 | Henke et al. |
| 4,530,051 A | 7/1985 | Johnson et al. |
| 4,545,071 A | 10/1985 | Freeburg |
| 4,707,592 A | 11/1987 | Ware |
| 4,709,136 A | 11/1987 | Watanabe |
| 4,799,156 A | 1/1989 | Shavit et al. |
| 4,947,028 A | 8/1990 | Gorog |
| 4,955,049 A | 9/1990 | Ghisler |
| 5,020,093 A | 5/1991 | Pireh |
| 5,053,606 A | 10/1991 | Kimizu |
| 5,099,420 A | 3/1992 | Barlow et al. |
| 5,220,564 A | 6/1993 | Tuch et al. |
| 5,283,639 A | 2/1994 | Esch et al. |
| 5,412,416 A | 5/1995 | Nemirofsky |
| 5,426,427 A | 6/1995 | Chinnock et al. |
| 5,475,819 A | 12/1995 | Miller et al. |
| 5,483,596 A | 1/1996 | Rosenow et al. |
| 5,600,364 A | 2/1997 | Hendricks et al. |
| 5,604,542 A | 2/1997 | Dedrick |
| 5,604,803 A | 2/1997 | Aziz |
| 5,638,513 A | 6/1997 | Ananda |
| 5,655,077 A | 8/1997 | Jones et al. |
| 5,675,507 A | 10/1997 | Bobo, II |
| 5,684,950 A | 11/1997 | Dare et al. |
| 5,689,638 A | 11/1997 | Sadovsky |
| 5,721,780 A | 2/1998 | Ensor et al. |
| 5,802,304 A | 9/1998 | Stone |
| 5,862,339 A | 1/1999 | Bonnaure et al. |
| 5,884,024 A | 3/1999 | Lim et al. |
| 5,889,958 A | 3/1999 | Willens |
| 5,892,900 A | 4/1999 | Ginter et al. |
| 5,896,444 A | 4/1999 | Perlman et al. |
| 5,898,780 A | 4/1999 | Liu et al. |
| 5,898,839 A | 4/1999 | Berteau |
| 5,913,040 A | 6/1999 | Rakavy et al. |
| 5,918,013 A | 6/1999 | Mighdoll et al. |
| 5,935,207 A | 8/1999 | Logue et al. |
| 5,940,074 A | 8/1999 | Britt, Jr. et al. |
| 5,950,010 A | 9/1999 | Hesse et al. |
| 5,974,461 A | 10/1999 | Goldman et al. |
| 5,983,273 A | 11/1999 | White et al. |
| 6,023,585 A | 2/2000 | Perlman et al. |
| 6,023,698 A | 2/2000 | Lavey, Jr. et al. |
| 6,026,079 A | 2/2000 | Perlman |
| 6,061,798 A | 5/2000 | Coley et al. |
| 6,070,192 A | 5/2000 | Holt et al. |
| 6,073,168 A | 6/2000 | Mighdoll et al. |
| 6,128,663 A | 10/2000 | Thomas |
| 6,134,590 A | 10/2000 | Perlman |
| 6,138,119 A | 10/2000 | Hall et al. |
| 6,141,694 A | 10/2000 | Gardner |
| 6,178,505 B1 | 1/2001 | Schneider et al. |
| 6,185,685 B1 | 2/2001 | Morgan et al. |
| 6,289,450 B1 | 9/2001 | Pensak et al. |
| 6,311,197 B2 | 10/2001 | Mighdoll et al. |
| 6,571,290 B2 | 5/2003 | Selgas et al. |
| 6,721,784 B1 | 4/2004 | Leonard et al. |
| 6,824,051 B2 | 11/2004 | Reddy et al. |
| 6,990,684 B2 | 1/2006 | Futamura et al. |
| 7,143,296 B2 | 11/2006 | Hirata |
| 7,149,893 B1 | 12/2006 | Leonard et al. |
| 7,290,285 B2 | 10/2007 | McCurdy et al. |
| 7,310,821 B2 | 12/2007 | Lee et al. |
| 7,398,556 B2 | 7/2008 | Erickson |
| 7,406,596 B2 | 7/2008 | Tararukhina et al. |
| 7,418,737 B2 | 8/2008 | Grupe |
| 7,472,280 B2 | 12/2008 | Giobbi |
| 7,590,861 B2 | 9/2009 | Abdallah et al. |
| 7,870,198 B2 | 1/2011 | Graham et al. |
| 8,205,078 B2 | 6/2012 | Bhogal et al. |
| 8,239,682 B2 | 8/2012 | Meehan et al. |
| 8,290,160 B1 | 10/2012 | Steeger |
| 8,474,058 B2 | 6/2013 | Benson et al. |
| 8,677,126 B2 | 3/2014 | Meehan et al. |
| 8,838,704 B2 | 9/2014 | Naylor et al. |
| 9,003,548 B2 | 4/2015 | Pigin |
| 9,094,215 B2 | 7/2015 | Meehan et al. |
| 2001/0029581 A1 | 10/2001 | Knauft |
| 2002/0010679 A1 | 1/2002 | Felsher |
| 2002/0027992 A1 | 3/2002 | Matsuyama et al. |
| 2002/0048369 A1 | 4/2002 | Ginter et al. |
| 2002/0073046 A1* | 6/2002 | David .................... G06Q 20/12 705/67 |
| 2002/0082997 A1 | 6/2002 | Kobata et al. |
| 2002/0091928 A1 | 7/2002 | Bouchard et al. |
| 2002/0099941 A1 | 7/2002 | Tanimoto |
| 2002/0107809 A1* | 8/2002 | Biddle .................. G06F 21/105 705/59 |
| 2002/0129275 A1 | 9/2002 | Decuir |
| 2003/0037237 A1 | 2/2003 | Abgrall et al. |
| 2003/0044012 A1 | 3/2003 | Eden |
| 2003/0191946 A1 | 10/2003 | Auer et al. |
| 2004/0003139 A1 | 1/2004 | Cottrille et al. |
| 2004/0003269 A1 | 1/2004 | Waxman et al. |
| 2004/0022390 A1 | 2/2004 | McDonald et al. |
| 2004/0039916 A1* | 2/2004 | Aldis .................... G06F 21/105 713/177 |
| 2004/0148356 A1 | 7/2004 | Bishop et al. |
| 2005/0060537 A1 | 3/2005 | Stamos et al. |
| 2005/0120212 A1 | 6/2005 | Kanungo et al. |
| 2005/0177873 A1 | 8/2005 | Wu et al. |
| 2005/0229258 A1 | 10/2005 | Pigin |
| 2007/0033397 A1 | 2/2007 | Phillips, II et al. |
| 2007/0050696 A1 | 3/2007 | Piersol et al. |
| 2007/0067618 A1 | 3/2007 | Sandhu et al. |
| 2013/0326220 A1 | 12/2013 | Connelly et al. |
| 2015/0244688 A1 | 8/2015 | Pigin |
| 2016/0028700 A1 | 1/2016 | Meehan et al. |

FOREIGN PATENT DOCUMENTS

| | | |
|---|---|---|
| EP | 0421808 B1 | 12/1994 |
| EP | 0501967 B1 | 5/1995 |
| EP | 0479660 B1 | 10/1996 |
| EP | 0745924 A2 | 12/1996 |
| EP | 0384339 B1 | 4/1997 |
| EP | 0506637 B1 | 8/2001 |
| EP | 0650307 B1 | 3/2004 |
| EP | 0814589 B1 | 8/2004 |
| GB | 2190820 A | 11/1987 |
| GB | 2289598 A | 11/1995 |
| WO | 8603926 A1 | 7/1986 |
| WO | 9317529 A1 | 9/1993 |
| WO | 9600485 A2 | 1/1996 |
| WO | 9707656 A2 | 3/1997 |

(56) References Cited

FOREIGN PATENT DOCUMENTS

| | | |
|---|---|---|
| WO | 9709682 A1 | 3/1997 |
| WO | 2010097480 A2 | 9/2010 |

OTHER PUBLICATIONS

Bott et al., "Microsoft Windows Security Inside out", Microsoft Press, Jan. 1, 2003, 14 pages.
Microsoft Computer Dictionary, Microsoft Press, 5th Edition, 2002, 3 pages.
Schneider, F.B., "Trust in Cyberspace", Committee on Information Systems Trustworthiness, Dec. 22, 1998, 249 pages.
"Authentica Unveils Saferoute for Secure Messaging", Press Release, Dec. 16, 2002, 2 pages.
Thomas, Shane, "International Search Report" Prepared from PCT/US16/28834, dated Aug. 30, 2016, 4 pages.

\* cited by examiner

FIG. 14F

METHOD AND SYSTEM FOR DIGITAL RIGHTS MANAGEMENT OF DOCUMENTS

This patent application is a continuation of U.S. patent application Ser. No. 15/852,175 filed on Dec. 22, 2017. U.S. patent application Ser. No. 15/852,175 is a continuation of U.S. patent application Ser. No. 14/755,622 filed on Jun. 30, 2015. U.S. patent application Ser. No. 14/755,622 is a continuation of U.S. patent application Ser. No. 14/162,979 filed on Jan. 24, 2014. U.S. patent application Ser. No. 14/162,979 is a continuation of U.S. patent application Ser. No. 13/538,637 filed on Jun. 29, 2012. U.S. patent application Ser. No. 13/538,637 is a continuation of U.S. patent application Ser. No. 11/237,564 filed on Sep. 28, 2005. U.S. patent application Ser. Nos. 15/852,175, 14/755,622, 14/162,979, 13/538,637 and 11/237,564 are hereby incorporated by reference.

TECHNICAL FIELD

The present invention relates in general to securing transmitted electronic documents and, more particularly, to enforcing a rights management policy on transmitted electronic documents.

BACKGROUND INFORMATION

Security of transmitted electronic documents has been the subject of great attention in the data processing industry. The misuse or misappropriation of confidential information is a serious threat to electronic commerce. Even the perceived risk of insufficient integrity will render a data processing method unworthy for commercial use. System administrators and service providers have been responsible for creating policies and implementing procedures for ensuring the security of files transferred over a network. The majority of security measures has been focused on controlling access to infrastructure, such as a network domain or a storage media. For example, securing documents sent by e-mail was primarily accomplished by restricting access to a given e-mail account. Another common method is to compress or encrypt documents sent via e-mail. However, due to the unsecured nature of e-mail, many forms of business and transactions are still not conducted using e-mail messages and documents. Also, these kinds of policies do not have any effect on a user or a file after the document has been received via e-mail and made available for further processing.

Therefore, newer security architectures have emphasized providing security in the user environment at the application level, when the document is manipulated by the receiving party. Typically, point of use security methods require global coverage of an IT system with the corresponding installation of central tools and distributed agents. This kind of additional digital rights management infrastructure added to an IT system requires a large initial investment and significant administration effort over time. A centralized system can also be very inflexible and may not meet the specific needs of individual stakeholders. For example, if the system architecture requires that every document be registered with the authenticating server, then the system must rely upon the authenticating server for rights management policies. Such an architecture is inherently limited to securing participants within the domain, which inherently limits the scope of the security provided. Thus, there is a need for a simplified, decentralized method for securing e-mail messages and documents at their point of use, that can be universally used by any recipient of an e-mail message.

A common problem of practicality when transmitting encrypted content is that the sender and recipient are required to exchange keys in advance of the actual transmission. If a sender wants to send an encrypted document securely to a recipient, prior art methods have required that the sender possess the public key of the recipient before the encrypted content is transmitted.

Another aspect of digital rights management that has yet to be addressed is the time-dependent nature of many usage rights policies. When the digital rights to a document that already has been transmitted need to be changed, prior art systems have not offered simple, transparent solutions. For example, a frequent requirement in business communications is the widespread distribution of documents in advance of a specific date when such documents may be accessed by a large number of recipients. There has been no solution available that provides a robust, integrated, and automated solution to this common scenario.

Therefore, there is a need for a simple, flexible digital rights management system for transmitting documents and messages via e-mail, such that users may freely exchange encrypted data. The system should be decentralized and enable flexible management of digital rights over time, without requiring a global IT installation and additional administration.

SUMMARY OF THE INVENTION

The present invention addresses the foregoing needs by providing a solution with point of use digital rights management for transmission of files via e-mail. The present invention utilizes a cryptocontainer, having a unique structure and properties, for packaging digital content upon transmission via e-mail. The digital content may comprise electronic documents and data files, or any other type of digital media content. The sender of the secured documents configures the cryptocontainer using an authoring tool for generating and distributing cryptocontainers, whereby the authoring tool applies a public key belonging to a key server. The authoring tool provides for assigning specific access rights to individual documents that may very over time. The access rights may be customized for individual recipients of the cryptocontainer. Only after validated authorization and decryption may the e-mail recipient of the cryptocontainer be granted their access rights to specific content in the cryptocontainer.

The present invention additionally solves the problem of a sender wanting to send an encrypted document securely to a recipient, whose public key the sender does not possess. The present invention employs a key server to decipher a session key for the encrypted content. Instead of encrypting the session key for the recipient, the session key is encrypted for the key server. The key server authenticates the recipient independently (from an authenticating entity) and releases the session key to the recipient only after the recipient's authentication certificate is obtained.

The access rights are enforced according to the time-dependent scheme defined in the authoring tool of the cryptocontainer for that specific user. During the entire process of transmitting and receiving e-mail messages and documents, the exchange of cryptographic keys remains totally transparent to the users of the system. There is no requirement that senders and recipients manually exchange keys. The present invention provides additional security in that the transmitted content of a cryptocontainer is only decrypted in a second decryption step, only after an initial decryption has provided authentication of the recipient's identity. Otherwise, the transmitted content is not decrypted. Senders of e-mail may be so assured that the digital content transmitted may only be received by an authorized user and may only be further processed subject to the conditions of use as designated by the sender.

Additionally, the present invention provides for digitally signing electronic documents with authentication of the signature. The electronic signature in the present invention relies upon and is compliant with 15 U.S.C. § 7001, ELECTRONIC RECORDS AND SIGNATURES IN COMMERCE, General Rule of Validity, of which subsection (a) recites:

15 § 7001, General rule of validity
In general
Notwithstanding any statute, regulation, or other rule of law (other than this subchapter and subchapter II of this chapter), with respect to any transaction in or affecting interstate or foreign commerce—
a signature, contract, or other record relating to such transaction may not be denied legal effect, validity, or enforceability solely because it is in electronic form; and
a contract relating to such transaction may not be denied legal effect, validity, or enforceability solely because an electronic signature or electronic record was used in its formation.

The intent of each signature may be further specified by the signing individual with a text entry accompanying the signature.

In one example of the present invention, a marketing department may use the usage rights timeline to make an upcoming brochure unavailable until a given date. On the given date only the recipients in the user groups "Internal Sales" and "Management" can have rights to view and print the brochure. A week after "External Sales" is given rights to view and distribute the brochure in "view only" form. Two-weeks later on the pre-determined release date the brochure can be freely distributed and printed by its recipients.

In another example of the present invention, a financial service sends an e-mail listing the latest quarterly earning reports of "ACME Company" to its distribution list 24-hours before its public release. The service company utilizes the usage rights timeline to ensure that the information is disclosed to all of its recipients at the same time. Employees of the financial service are given permission to only view, but not distribute, the information some hours before its public disclosure. At the given pubic release time, the employees will be able to freely distribute the "ACME Company" earnings report to members of the public.

Thus an object of the present invention is to enable the widespread and transparent use of e-mail documents and messages for highly secure applications.

Another object of the present invention is to provide for decryption of content in a second step following an initial authentication of recipient on receipt of an e-mail message, and to deny decryption of content in case the recipient cannot be authenticated.

Another object of the present invention is to provide a secure mechanism for digital rights management of documents transmitted over a network using a transactional authentication methodology for enforcement of usage rights policies, such that access to a server is only required for initiating access granted to secured documents.

An object of the present invention is to provide a mechanism whereby senders of secured e-mail messages may rely upon an e-mail address for identifying an authenticated recipient, without the requirement of contacting the recipient or exchanging keys with the recipient in advance of sending an e-mail message.

An additional object of the present invention is to provide a means for displaying the security rating of an e-mail client over a given time period.

Another object of the present invention is to provide a means for assigning usage permissions to individuals and user groups of selected individuals.

A further object of the present invention is to provide time-dependent digital rights for digital content transmitted via e-mail, such that the user-specific rights may change or evolve as a function of elapsed time.

A further object of the present invention is to provide time-dependent digital rights for digital content transmitted via e-mail, such that the user-specific rights may be modified in response to actions by the user of the digital content or by third-parties.

Another object of the present invention is to provide a mechanism for digitally authenticating an electronic signature transmitted via e-mail. The electronic signature may be augmented with a text line where the signer may specify the intent of the signature.

An additional object of the present invention is to provide for the migration and back-up of encrypted data and encryption tools to another physical hardware platform.

Another object of the present invention is to prohibit the circumvention of restricted processing rights for digital content by using a hardware overlay technique for rendering the digital content visible on a display device.

A further object of the present invention is to provide an audit trail of all documents sent and received using a secured e-mail transmission system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 14A-F illustrate a graphical user interface in an embodiment of the present invention.

DETAILED DESCRIPTION

Figure 1:
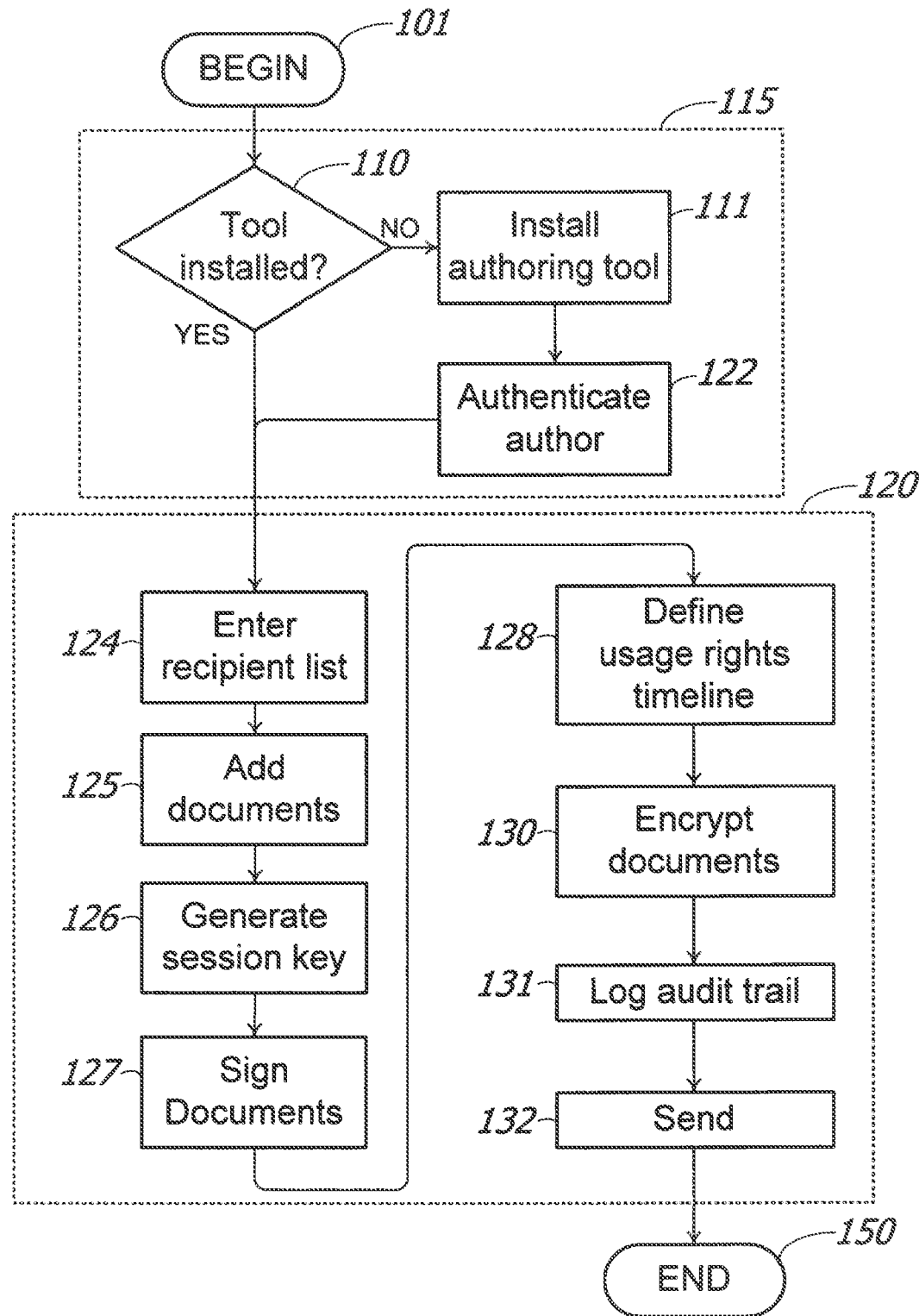
FIG. 1 is a flow chart of an encryption process in an embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides a solution with point of use digital rights management for transmission of files via e-mail. The present invention utilizes a cryptocontainer, having a unique structure and properties, for packaging digital content upon transmission via e-mail. The digital content may comprise electronic documents and data files, or any other type of digital media. Any reference herein to electronic documents, documents, files, messages, data, media, and other content may be used interchangeably and refers universally to digital content which may be transmitted over a network or stored in a memory or storage device. The sender of the secured documents configures the cryptocontainer using an authoring tool for generating and distributing cryptocontainers, whereby the authoring tool applies a public key belonging to an key server. The authoring tool provides for assigning specific access rights, which may vary over time, to individual documents. The access rights may be customized for individual recipients of the cryptocontainer. Only after validated authorization and decryption may the e-mail recipient be granted access rights to specific content in the cryptocontainer.

Figure 13:
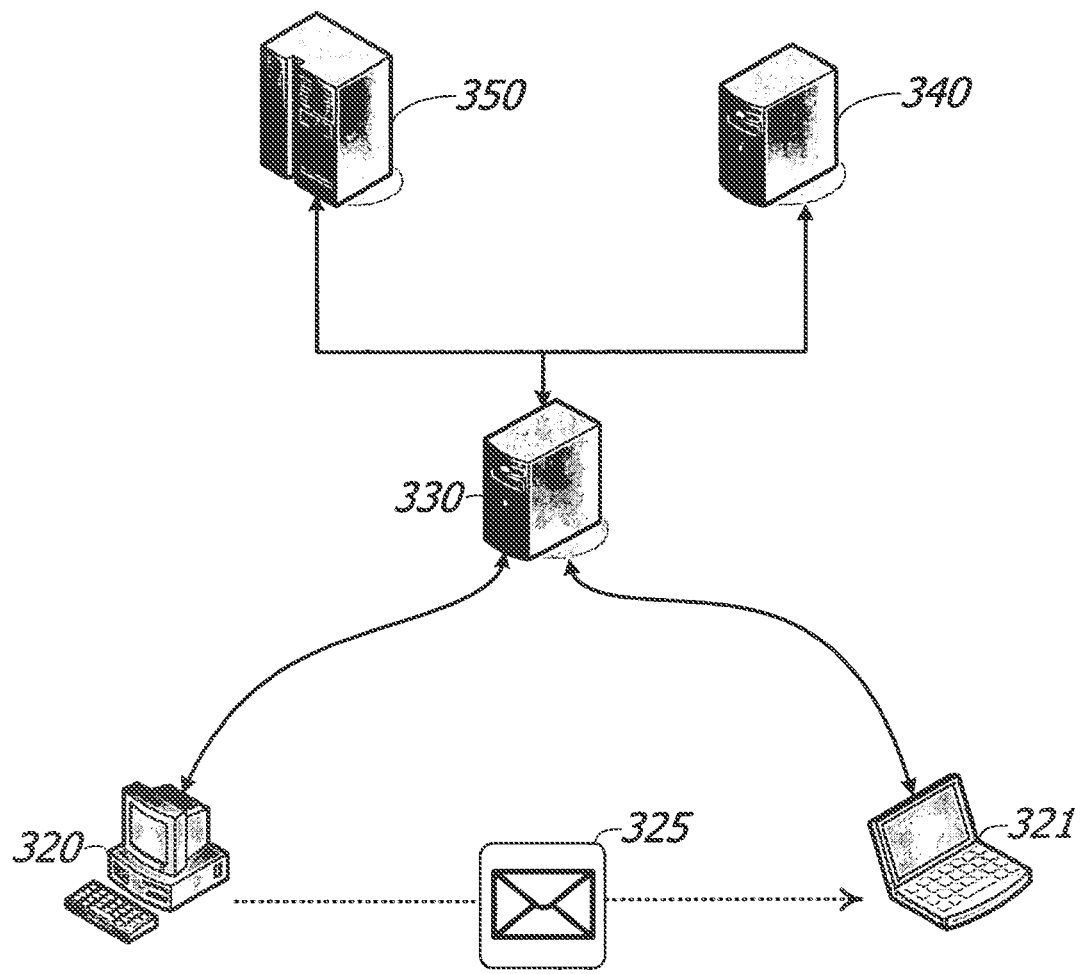
FIG. 13 illustrates network components in one embodiment of the present invention.

In FIG. 13, network components in one embodiment of the present invention are illustrated. A sending platform 320 runs the authoring tool and is operated by the author. The author creates a cryptocontainer, symbolized by 325, and sends it via e-mail to the recipient operating the receiving platform 321, which runs the viewing tool. A server 330 may provide services to the sending platform 320 or to the receiving platform 321. The server 330 may represent a public web server that both platforms 320, 321 may connect to via the Internet. In one embodiment, the server 330 is a public web server for accessing the authoring tool or the viewing tool as web services. The server 330 may rely upon an key server 340 to perform the operations of the present invention. In one embodiment, the server 330 and key server 340 represent network services that are executed on a single physical platform, such that servers 330 and key server 340 are combined into a single entity. The key server 340 may rely upon an authenticating server 350 for authenticating e-mail addresses of authors and recipients of cryptocontainers 325. The authentication server 350 may be operated by a third-party as a public commercial service for authenticating users via e-mail addresses for clients.

Referring to FIG. 1, a process 115, 120 for sending encrypted content according to an embodiment of the present invention is illustrated in flow chart form, from begin 101 to end 150. An initial configuration process 115 must be performed before the authoring and sending process 120 may be executed, if not previously carried out, according to a determination 110. In one example of practicing the present invention, the entire procedure of 115 may be omitted after one instance of installation 115 has been performed. In another example, the determination if the authoring tool is installed 110 may result in either steps 111 and 122, singly or in combination, being executed for the purpose of updating a prior installation or recertifying a prior authentication.

The installation of the authoring tool HI comprises all actions required for obtaining an installable, licensed version of the authoring tool, for performing an installation, and for configuring an authoring tool for use on a given sending platform 320. The installation step 111 may also include steps for verifying the network connection of the sending platform 320, comprising configuration of hardware and software components, such that an e-mail service is made bi-directionally operational on the sending platform. Additionally, step 111 may also encompass communicating with an key server 340 for obtaining or validating the key server's public key, which is used by the authoring tool on the sending platform 320. In one example, installation 111 of the authoring tool is performed by installing the authoring tool as an application to be executed on the sending platform 320. In another example, installation 111 of the authoring tool is performed by activating a license to use the authoring tool as web service to be executed on an Internet server 330.

The author is an individual who operates the authoring tool on the sending platform 320 for creating, modifying, and distributing cryptocontainers 325, containing electronic documents and digital data. The author is also the individual who assigns the usage rights 128 for each document in the cryptocontainer 325. The author is therefore the author and also the sender of the cryptocontainer 325, however, no assumption is made herein as to the authoring of the actual digital content transmitted in the cryptocontainer 325 in various embodiments of the present invention.

The step of authenticating an author 122 may be performed by the key server 340 on the basis of the author's e-mail address from an authenticating server 350. The key server 340 creates a user license for the author, signs the author's license and public key with the key server's private key, and stores this as a hash value for authenticating messages from the author (step 122). In one embodiment of the present invention, the authoring tool may be installed for use by the author on a sending platform 320, such as a computer system, such that the authentication of the author 122 involves sending a hardware fingerprint, which identifies the sending platform, to the key server 340 for authentication by an authenticating server 350. The hardware fingerprint may comprise the following information unique to the computer on which the authoring tool is installed: BIOS version number, video card BIOS creation date, primary HDD serial number, MAC address of a network adapter. In another example, the hardware fingerprint may comprise a unique identifier of the CPU, main system board, or other component of the sending platform computer 320.

In another embodiment of the present invention, the authoring tool may be installed on server 330 and used as a web service in an Internet browser, such that the authentication of the author 122 relies upon a unique biometric identification of the author that is sent to the key server 340 for authentication by an authentication server 350. In one example a biometric USB device installed on a public computer system may be used by the author for generating the unique biometric identification. The biometric identification is used by the key server 340 to obtain the author's license from the authenticating server 350 in the same manner as the hardware fingerprint. In another example of practicing the present invention, the authoring tool is integrated as an additional feature in a standard e-mail client program.

After the installation steps 115 have been completed at least once without error, the process in 120 may be repeated as required to send a plurality of secured e-mail messages containing cryptocontainers 325. According to another embodiment of the present invention, installation of the authoring tool 111 may also comprise the transferring (or migration) of an existing installation of a working version of the authoring tool from a previous sending platform to the current sending platform 320. The transferring (or migration) may include all existing data and archived documents along with the necessary re-validation and re-authentication (as in 122) on the current sending platform 320.

The sending process is illustrated by the process steps 120 in FIG. 1. Upon authentication 122 by an authenticating server 350, the author is granted full access to the authoring tool on the sending platform 320 by the key server 340. One first step may be entry of the recipient list 124. Individual recipients may be assigned membership to one or more user groups 610, 613 (see FIG. 6), which may be used for managing usage rights for each document in the cryptocontainer 325. After entry of the recipient list, the author may add the digital content to the cryptocontainer 325 by selecting the required files 125. In 127 the author may also optionally choose to electronically sign certain documents (see FIGS. 5 and 12). The authoring tool generates a symmetric session key 126 for each cryptocontainer 325. In the recipient list section of the cryptocontainer 325, a session key and a list of recipients' e-mail addresses is recorded. This entire section of the cryptocontainer 325 is encrypted not for the recipients but for the key server 340. The key server's public key is used to encrypt the recipient list section using asymmetric encryption. In alternative embodiments of the sending process 120, the order of the steps 124-127 may be rearranged to accommodate a flexible workflow. The order of the steps 124-127 is generally not constrained by the authoring tool.

For each document and recipient, a usage rights timeline may be defined by the author in step 128. The usage rights timeline gives an author the ability to set usage permissions on digital content (digital rights management controls, see FIG. 4) which may evolve in accordance with time or specific actions. In its simplest form, the usage rights timeline can be used to deny access to files on a specific time and date. In its full use, the usage rights timeline can be used to quickly set complex usage permission structures that change with time. Using the usage rights timeline, authors can create keyframes 1110 (see FIG. 11), which are sets of predefined rights states that exist for a specified period of time. Different usage permissions can be applied to each keyframe 1110, enabling usage states to evolve in a pre-determined fashion. The usage rights timeline is enforced by the viewing tool, installed in process 220 (see FIG. 2).

After the author determines the recipients, content, and usage rights for the cryptocontainer 325, encryption 130 is performed by the authoring tool. During encryption 130 of the cryptocontainer 325, the recipient list section and the content payload are encrypted separately with different session keys. The session keys are encrypted with the public key of a the key server 340. In one embodiment of the current invention, the key server 340 is maintained by a service provider who also provides the license for the authoring tool on the sending platform 320, and public access rights to the key server 340 are restricted to license holders of the authoring tool. In another embodiment, the viewing tool is distributed freely to the public, including access rights to the key server 340 for viewing documents sent in cryptocontainers 325 according to their assigned usage rights.

In one embodiment of the present invention, each individual operation performed on a cryptocontainer 325, such as obtaining a session license from an authorizing server or adding a document for viewing or printing encrypted in the cryptocontainer 325, is recorded in a log which may serve as an audit trail 131 for reconstructing events that occurred involving the cryptocontainer 325. The audit trail 131 may also include each time that usage rights keyframes 1110 were defined and the files and recipients to which those keyframes 1110 were assigned.

The final step in the sending process 120 is transmitting the cryptocontainer 325 via e-mail 132. The cryptocontainer 325 may be sent 132 with an standard e-mail client program from the sender to each recipient on the recipient list. In one embodiment of the present invention, the authentication process requires the author to use the computer that has been certified from the key server 340 for the author's sending e-mail address. In another example, a biometric identification has been performed to authenticate the sender, which in turn, permits the sender to work on any suitable public sending platform 320. In one case, the sender may use a unique biometric identification with a web service version of the authoring tool on the sending platform 320. The transmission of the cryptocontainer from the sending platform 320 may be performed with any wired or wireless network connection that supports e-mail transmission. In one example, the sending platform is a handheld wireless device that provides a suitable e-mail client service. In another example, the cryptocontainer may be sent to an intermediary, from where the cryptocontainer is further distributed to the recipients on the recipient list.

Figure 2:
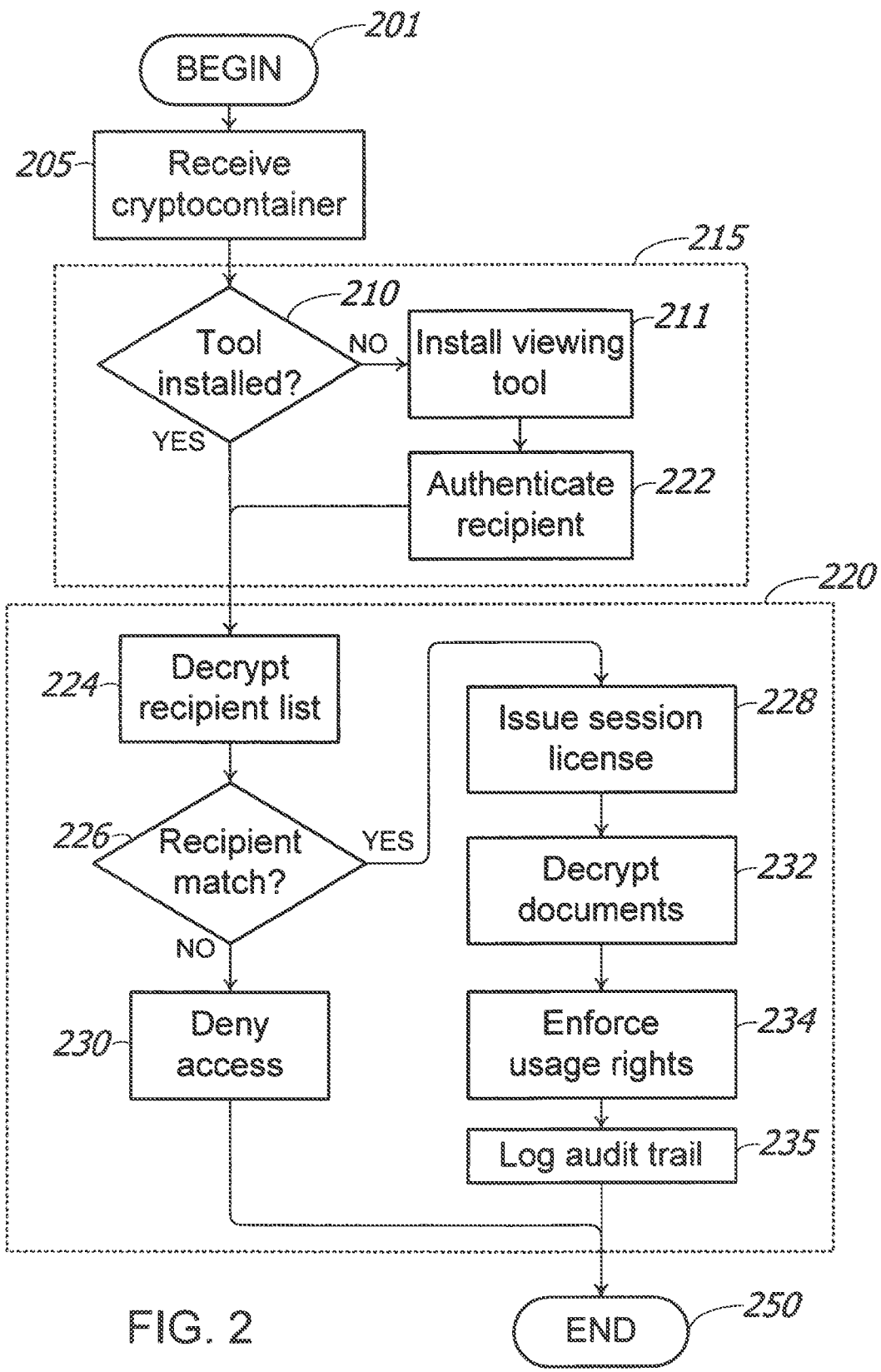
FIG. 2 is a flow chart of a decryption process in an embodiment of the present invention.

Referring to FIG. 2, a process 220 for receiving encrypted content according to an embodiment of the present invention is illustrated in flow chart form, from begin 201 to end 250. An initial configuration process 215 must be performed before the receiving process 220 may be executed, if not previously carried out, according to a determination 210. In one example of practicing the present invention, the entire procedure of 215 may be omitted after one instance of installation 215 has been performed. In another example, the determination if the viewing tool is installed 210 may result in either steps 211 and 222, singly or in combination, being executed for the purpose of updating a prior installation or recertifying a prior authentication.

The installation of the viewing tool 211 comprises all actions required for obtaining an installable, licensed version of the viewing tool, for performing the installation, and for configuring the viewing tool for use on a given receiving platform 321. The installation step 211 may also include steps for verifying the network connection of the receiving platform 321, comprising configuration of hardware and software components, such that an e-mail service is made bi-directionally operational on the receiving platform. In one example, installation 211 of the viewing tool is performed by installing the viewing tool as an application to be executed on the receiving platform 321. In another example, installation 211 of the viewing tool is performed by activating a license to use the viewing tool as service executed on web server 330 in a web browser, whereby the web browser is used to access a web e-mail client. Next, authentication of the recipient 222 is performed by the key server 340 using an authentication server 350.

In one embodiment of the present invention, the viewing tool is installed for use by the recipient on a receiving platform 321, such as a computer system, such that the authentication of the recipient 222 involves sending a hardware fingerprint, which identifies the sending platform 321, to the key server 340 for authentication by an authenticating server 350. Step 222 may encompass communicating with an key server 340 for validating the recipient's identity and transmitting a passport certificate, obtained from an authenticating server 350, identifying the recipient's computer (with a hardware fingerprint) and registering the recipient's computer passport and e-mail address.

In another embodiment of the present invention, the viewing tool may be installed on the web server 330 and used as a web service in an Internet browser, such that the authentication of the recipient 222 relies upon a unique biometric identification that is sent to the key server 340 for authentication by an authenticating server 350. In one example, the recipient may use a web mail service to access a primary e-mail account held by the recipient, whereby a biometric USB device is installed on a public computer system used by the recipient for generating the biometric identification. The unique biometric identification is used by the authenticating server 350 to generate the recipient's license in the same manner as the hardware fingerprint. In another example of practicing the present invention, the viewing tool is integrated as an additional feature in a standard e-mail client program.

In one example of the present invention, after the installation 215 has been completed once without error, the process in 220 may be repeated as required to receive a plurality of secured e-mail messages on the receiving platform 321. According to another embodiment of the present invention, installation of the viewing tool 211 may also comprise the transferring (or migration) of an existing installation of a working version of the viewing tool from a previous receiving platform to a current receiving platform 321. The transferring (or migration) may include all existing data and archived documents and be accompanied with a required re-validation and re-authentication (as in 222) on the current receiving platform 321.

In FIG. 2, the core receiving process is illustrated by the process steps 220. The entire receiving process in FIG. 2 is triggered by receipt of the cryptocontainer 325 via e-mail 205 by the recipient. Note that the recipient is not required to be in possession of any public keys. If the recipient is not authenticated and no viewing tool is installed, the installation process 215 will automatically be triggered upon accessing the cryptocontainer 325. This process requires only a standard e-mail client. If the recipient is authenticated and a viewing tool is installed, process 220 may be initiated.

The authentication step 222 may be precluded to some extent when a recipient already possesses a valid public key. This preauthentication begins when the viewing tool sends a certificate that authenticates the recipient to the key server 340 from the sending platform 321. In one case, an acceptable certificate is signed by an authentication server 350 and contains the recipient's e-mail address. This is taken as valid proof by the key server 340, that at some point in the past, the process has taken place by which the recipient had obtained that certificate and there is confidence that it could only have been obtained from a known authentication server 350. If the key server 340 receives a certificate for a recipient containing a public key and an e-mail address that is signed by a known authenticating server 340, then the recipient's identity is considered authentic. The recipient is preauthenticated by issuing the certificate. When the recipient actually contacts the key server 340 for a session key, reauthenticate is not required.

As a first step in process 220, a decryption of the recipient list 224 is performed. Step 224 begins with the author's public key, signed by the server's private key, being sent to the key server 340 by the viewing tool from the receiving platform 321. Then the encrypted recipient list and session keys are sent to the key server 340 by the viewing tool from the receiving platform 321. The recipient list is decrypted 224 by the key server 340. Next, the key server 340 compares 226 the recipient's identity with the recipient list of the cryptocontainer 325. If there is no match, then the recipient is denied access 230 to the cryptocontainer 325 by the key server 340 and no further action may be taken by the recipient on the cryptocontainer 325. The denial of access 230 is enforced by the viewing tool on the receiving platform 321, In this case 230, no session key is issued to the recipient by the key server 340 for the cryptocontainer 325. If the recipient does match the recipient list, then the key server 340 will issue 228 a session license for the recipient to open the contents of the cryptocontainer 325 on the receiving platform 321. In step 228, the key server 340 re-encrypts the session keys with the recipient's public key and sends the re-encrypted session keys back to the recipient's viewing tool on the receiving platform 321. The recipient's viewing tool receives the re-encrypted session keys and the decrypts them only when they are required to access a particular file in the cryptocontainer 325. The recipient may now decrypt and access 232 the content in the cryptocontainer 325 on the receiving platform 321. However, a recipient's access to individual documents may further be restricted by a usage rights timeline that is used to enforce 234 the policies in individual keyframes applicable to the recipient. If the content is closed by the recipient, the steps in process 220 may be repeated for each access to the cryptocontainer 325 on the receiving platform 321.

The usage rights timeline is enforced 234 by the viewing tool, installed in process 211. When the recipient opens a cryptocontainer 325, the viewing tool checks the time from a local time source or from a secured Internet time server. The viewing tool then enforces the rights schema 234 as designated by the content author using the usage rights timeline for the current time. As long as the viewing tool is active, it periodically checks the time and enforces the usage rights 234 for the given time. In one example, a secured time server is the primary time source and a secondary, local time source is used only when the primary time source is unavailable, thereby ensuring enforcements of rights schema 234, regardless if a network connection is maintained or not by the receiving platform 321.

One particularly unique aspect of the enforcement 234 of usage rights in process 220 is the use of a hardware-overlay technique for displaying secured documents. The viewing tool may use hardware overlay to render files directly from video hardware rather than by using software rendering. The advantage of this approach is that it helps to defeat many popular screen-capture products in a relatively simple fashion. In one embodiment of the present invention, during enforcement of usage rights 234, each individual operation performed on a cryptocontainer 325, such as obtaining a session license from an authorizing server or opening a document for viewing or printing encrypted in the cryptocontainer 325, is recorded in a log which may serve as an audit trail 235 for reconstructimg events that occurred involving the cryptocontainer 325. The audit trail 235 may also include each time the content was accessed and each time access to the cryptocontainer 325 was denied 230 or each time usage rights were restricted 234.

Of particular significance is the transactional nature of the involvement of the authentication server 350 and the key server 340 in processes 120 and 220. The transactional authentication methodology, as described in the embodiments of the present invention illustrated in FIGS. 1 and 2, limits the involvement of the authentication server 350 and the key server 340 to a minimum, which, in turn, serves to make the entire system very flexible and efficient. In the sending process 120, there is no requirement for the key server 340 to participate once an author has been authenticated by an authentication server 350 in 122. The receiving process 220 requires active participation from the key server 340 only for discrete steps 224, 226, and 228 upon receipt of the cryptocontainer 325, once a recipient has been authenticated by an authentication server 350 in 222. Of particular importance in certain embodiments of the present invention is that the enforcement of usage rights timeline policies is performed by the viewing tool on the receiving platform 321, and does not require any involvement by the key server 340. This unique feature of the present invention enables widespread distribution and use of secured digital rights management for e-mail documents by providing a practical and efficient architecture.

Figures 3, 4:
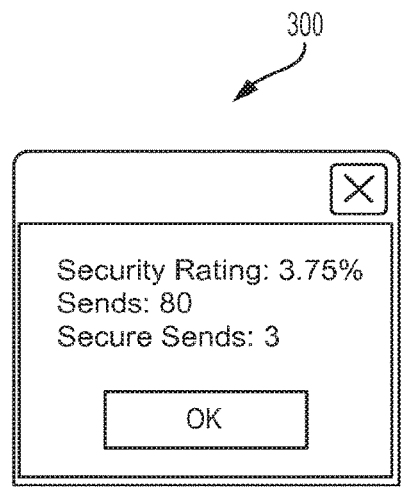
FIG. 3 is a display of a security rating of an e-mail client in an embodiment of the present invention.
FIG. 4 illustrates a graphical user interface element for defining usage rights in an embodiment of the present invention.

Referring now to FIG. 3, a display 300 of the security rating of an e-mail client is shown. The display 300 shows the values of the total number of e-mail messages sent as well as the number of those that were secured items. The values may be reset after a time period has elapsed. The display 300 also shows a ratio of the secured items sent. In one example, the percentage of secured items sent is used to calculate a security rating.

In FIG. 4, a graphical user interface element 400 is illustrated for defining usage rights in an embodiment of the present invention. The interface panel permits the definition of usage rights for specific files. Usage rights are presented in one example of a graphical user interface in a spreadsheet format 410 with files 411 on the left side and the usage rights 412 related to a specific data element 413 selected on the top. Tabs are used to toggle between the different data elements 413: Files, Folders, User Groups, Signature Lines and Containers. The exemplary user interface 400 is shown with the tab data element 413 (Files 411) selected. To allow a particular usage right 412, a check is entered in the associated box. The interface 400 provides the ability to assign a wide variety of usage rights 412 to files, folders, user groups, signature lines and the cryptocontainer 325 itself. In one example, the usage rights for files comprise: viewing, printing, export, delete, item visible, show thumbnail, rename, move. In one example, the usage rights for folders comprise: folder visible, delete, export, rename, file visible, move, open. In one example, the usage rights for folders comprise: folder visible, delete, export, rename, file visible, move, open.

Figure 5:
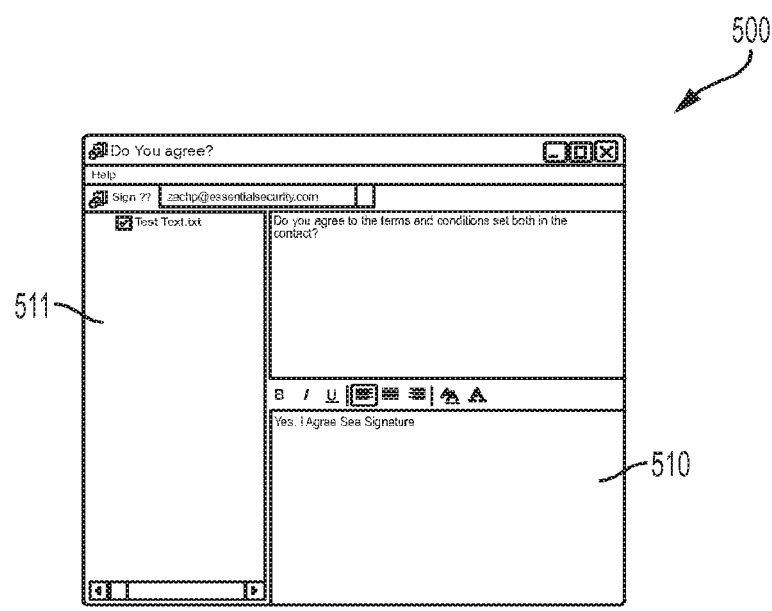
FIGS. 5 and 5A illustrate graphical user interfaces for electronic signatures in an embodiment of the present invention.
Figure 5A:
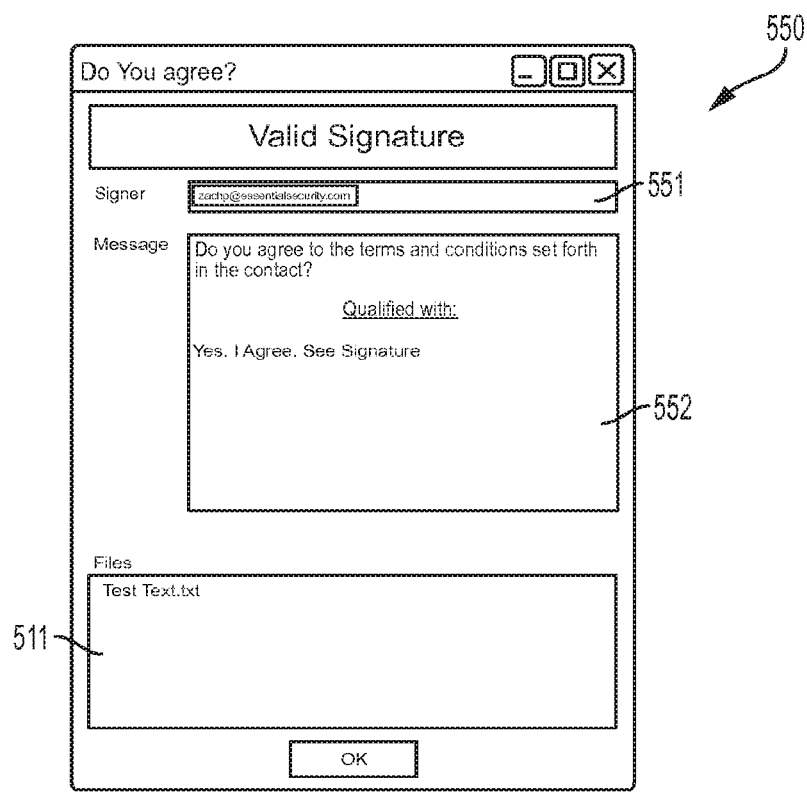

In FIG. 5, a graphical user interface 500 is illustrated for electronic signatures in an embodiment of the present invention. The electronic signature for a given document 511 may include an additional qualifier for the signature as a text field 510. In one example the purpose of the signature may be entered in this text field. In another example, the signer may choose from a predefined list of signature qualifiers. The electronic signature in the present invention relies upon and is compliant with 15 U.S.C. § 7001. In FIG. 5A, a confirmation panel 550 is illustrated of a valid electronic signature. The purpose and terms of the signature 552 are shown along with the e-mail address of the signee 551, and the document 511 for which the signature is valid.

Figure 6:
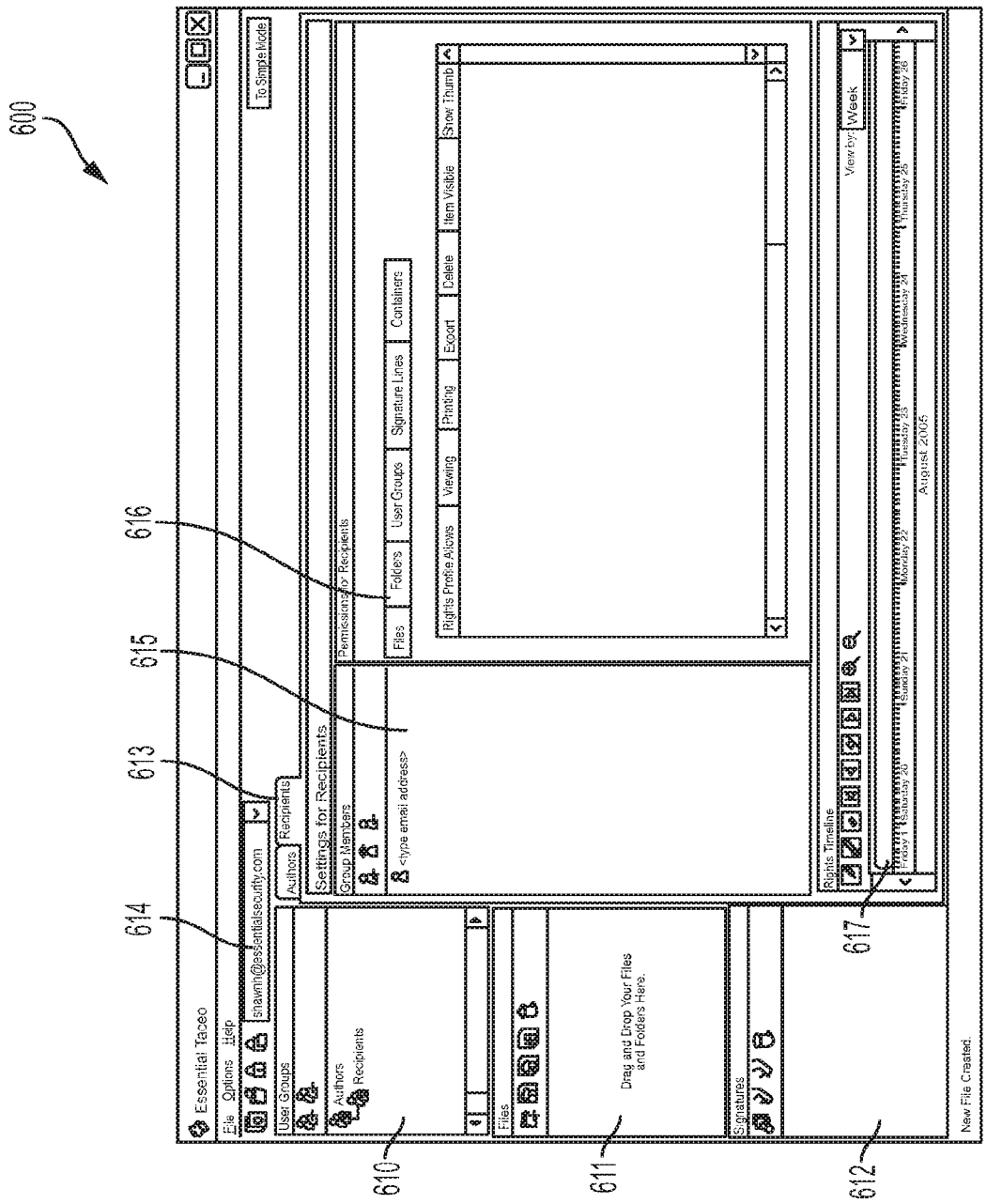
FIGS. 6-12 illustrate a graphical user interface in an embodiment of the present invention.

FIG. 6 illustrates a graphical user interface 600 of an authoring tool in a default state in an embodiment of the present invention. The authoring tool is used to construct and distribute a cryptocontainer 325. At the top, the authenticated e-mail address 614 of the author is shown. This is the sending e-mail address of the cryptocontainer 325. The panel 600 is the basic screen where all common tasks are performed in the authoring tool. To the left panels User Groups 610, 613, Files 611, and Signatures 612 can be added. The Files panel 611 displays the files to be protected and in panel 611 each file is identified by a filename and a filepath or network location path to that filename, such that the aggregate filepath identifying the file is unique and valid. The Signatures panel 612 displays any electronic signatures that have been performed on specific files in 611 by the author. The main workspace is defined by tabs which indicate the currently selected User Group 610, 613. In the default state, only Authors and Recipients are defined as User Groups 610, 613. Within a single user group, for example as shown in 600, Recipients, the list of authorized recipients within the selected User Group may be listed in the Group Members 615 panel. The permissions panel 616 corresponds to the usage rights user interface 400 in FIG. 4. Below, the Rights Timeline panel 617 indicates the time span to which the selected permissions apply. Each element in panel 617 is a keyframe in the usage rights timeline.

Figure 7:
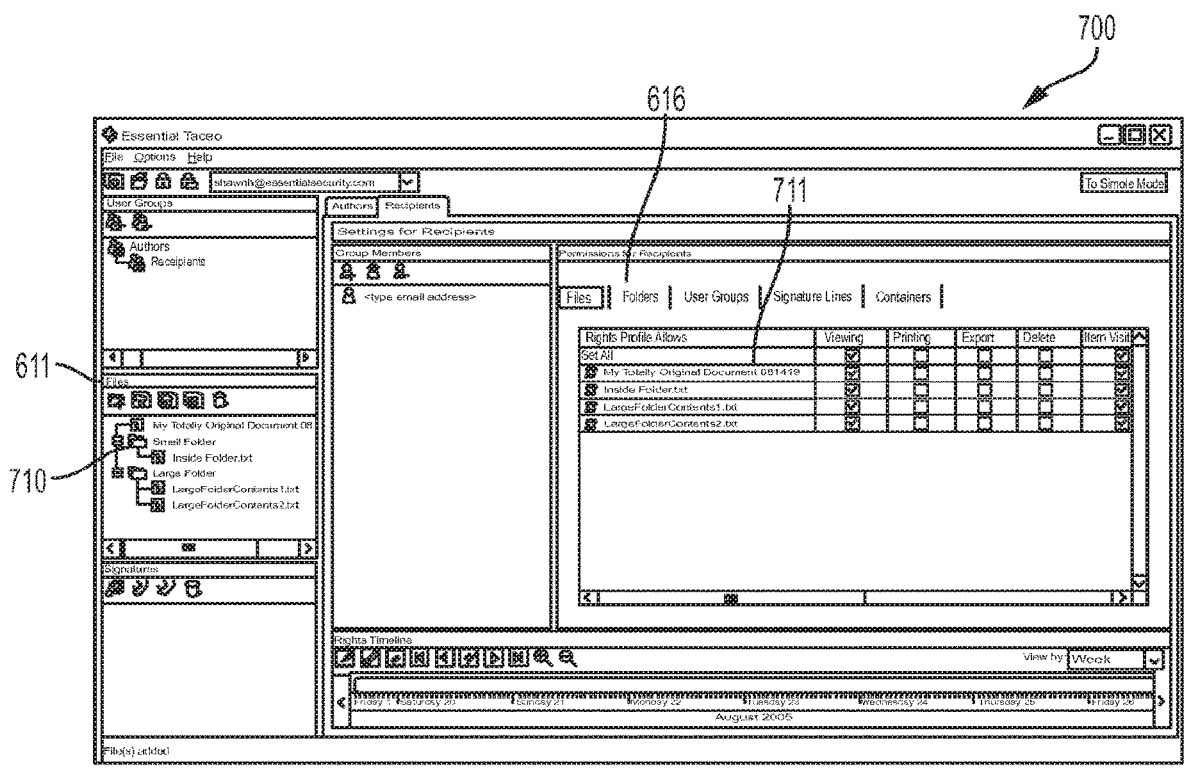

FIG. 7 illustrates a graphical user interface 700 of an authoring tool during entry of files 710 to a cryptocontainer 325 in an embodiment of the present invention. Files 710 may be added to Files panel 611 using the Import File or Import Folder button, or by dragging and dropping over panel 611. When the author saves the cryptocontainer, the files will be securely encrypted inside a cryptocontainer 325. The permissions panel 616 displays each individual file 710 as a separate line item 711. The permissions panel 616 corresponds to the usage rights user interface 400 in FIG. 4.

Figure 8:
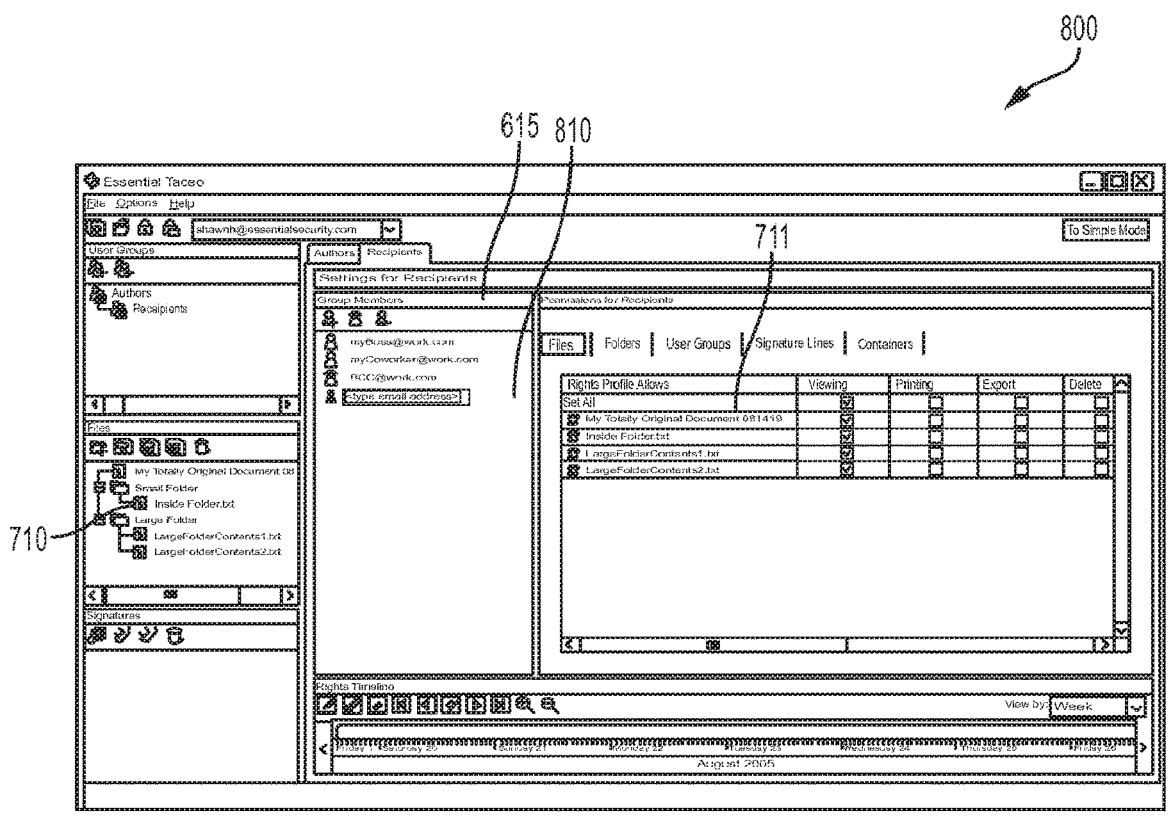

FIG. 8 illustrates a graphical user interface 800 of an authoring tool during entry of recipients 810 to a cryptocontainer 325 in an embodiment of the present invention. The list of recipient e-mail addresses 810 may be entered in the group members panel 615. This ensures that the files 710, 711 will be seen only by recipients 810 that are approved by the author.

Figure 9:
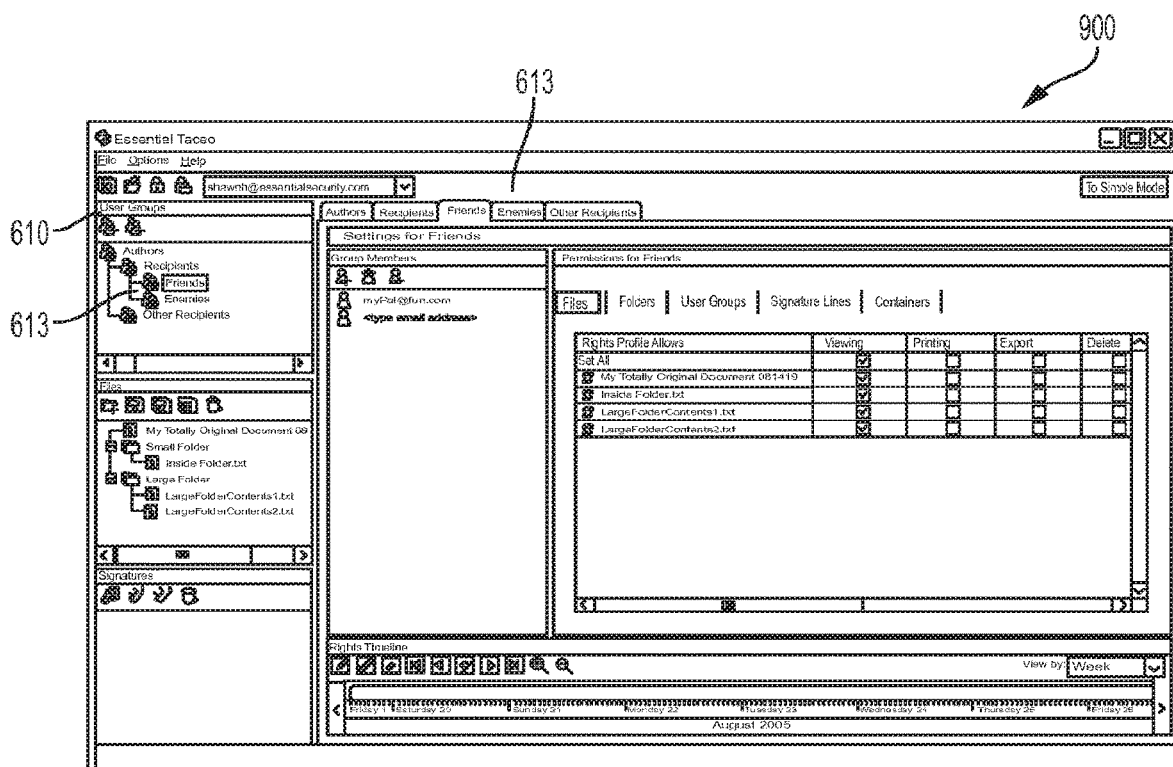

FIG. 9 illustrates a graphical user interface 900 of an authoring tool during entry of user groups 613 to a cryptocontainer 325 in an embodiment of the present invention, Recipients 810 can be categorized into groups 613, which are created in the, User Groups panel 610. Sorting recipients 810 into user groups 613 enables advanced control of usage rights 412 for each group 613.

Figure 10:
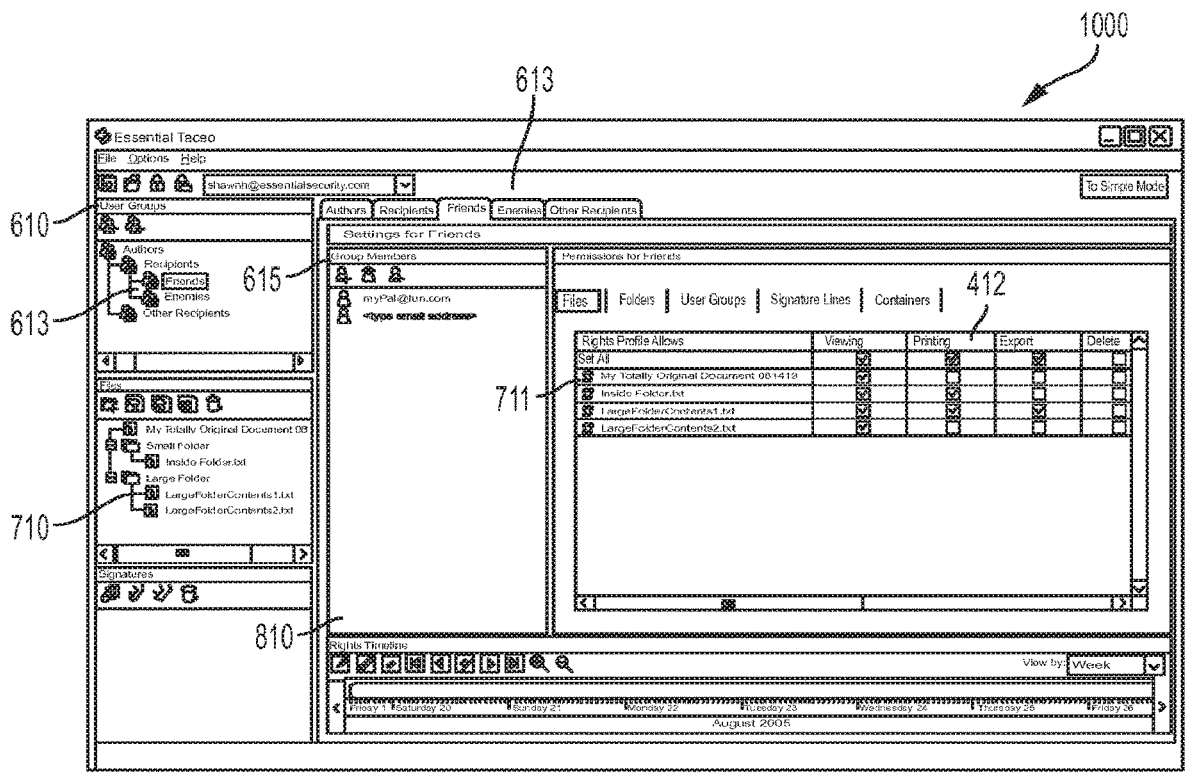

FIG. 10 illustrates a graphical user interface 1000 of an authoring tool during assignment of user rights 412 for user groups 613 in a cryptocontainer 325 in an embodiment of the present invention. After sorting recipients 810 into user groups 613, each user group 613 can be assigned different user rights 412 to individual files 710, 711. This permits cryptocontainer 325 files to be sent to multiple recipients 810 who have different usage rights 412.

Figure 11:
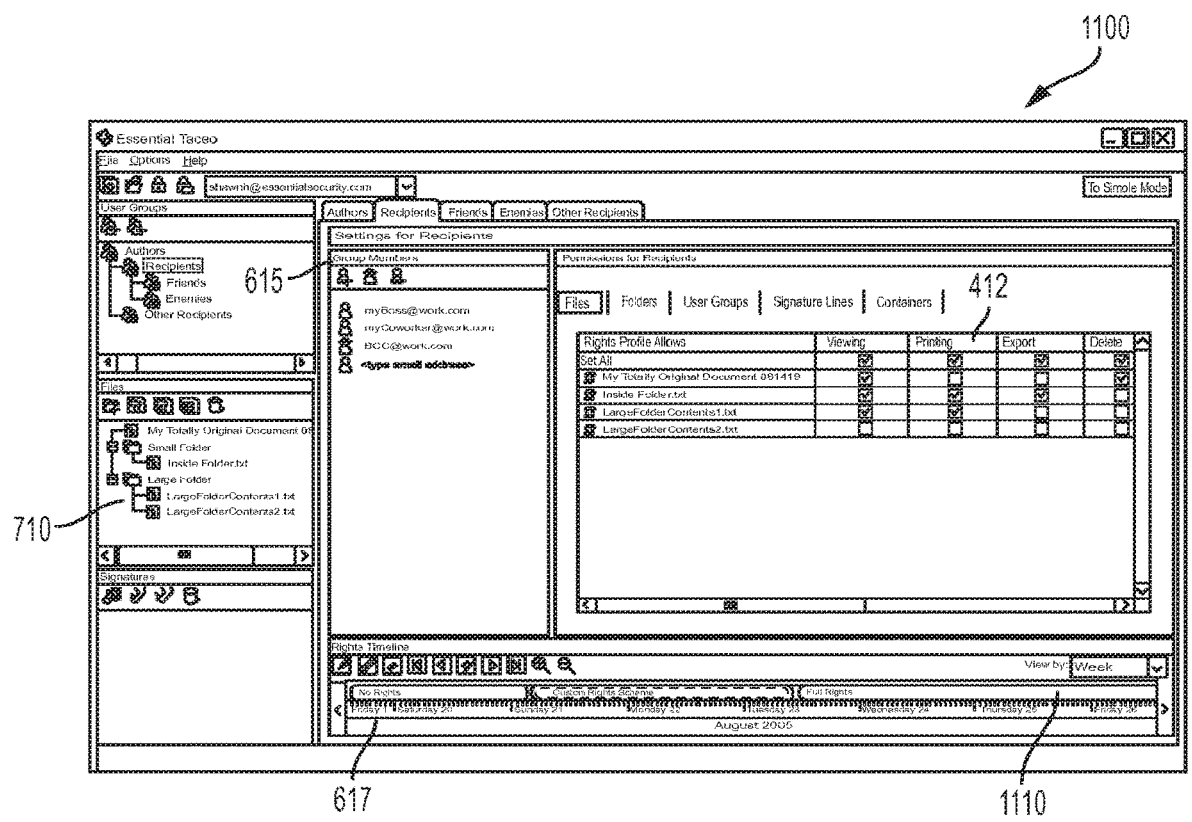

FIG. 11 illustrates a graphical user interface 1100 of an authoring tool during assignment of user rights 412 over time in a cryptocontainer 325 in an embodiment of the present invention. For files 710 that are time sensitive, individual keyframes 1110 in the Rights Timeline panel 617 define the exact days, hours, and seconds that files 710 may be accessed. The Rights Timeline panel 617 indicates the time span to which the selected usage rights 412 apply. Each element in panel 617 is a keyframe 1100 in the usage rights timeline.

Figure 12:
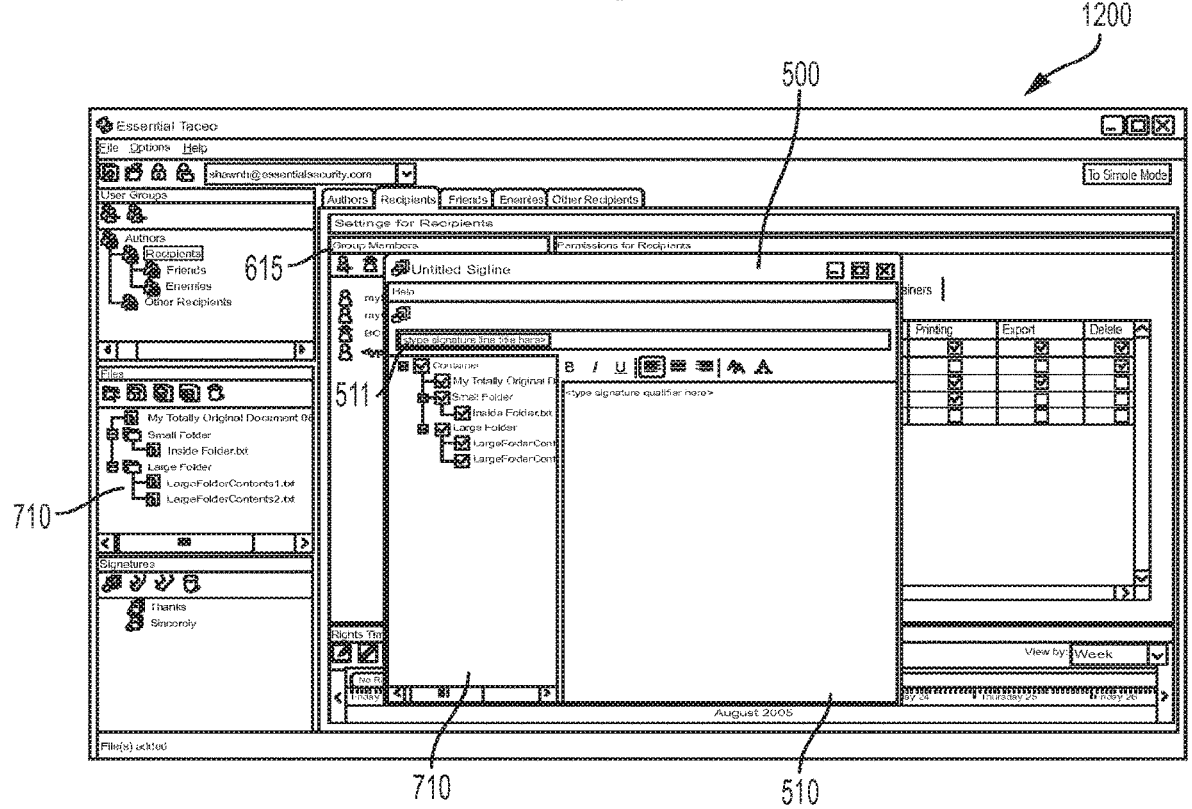

FIG. 12 illustrates a graphical user interface 1200 of an authoring tool performing an electronic signature 511 in a cryptocontainer 325 in an embodiment of the present invention. The signature panel 500 enables the author to electronically sign 511 individual files 710 in the cryptocontainer 325. The electronic signature in the present invention relies upon and is compliant with 15 U.S.C. § 7001.

Figure 14A:
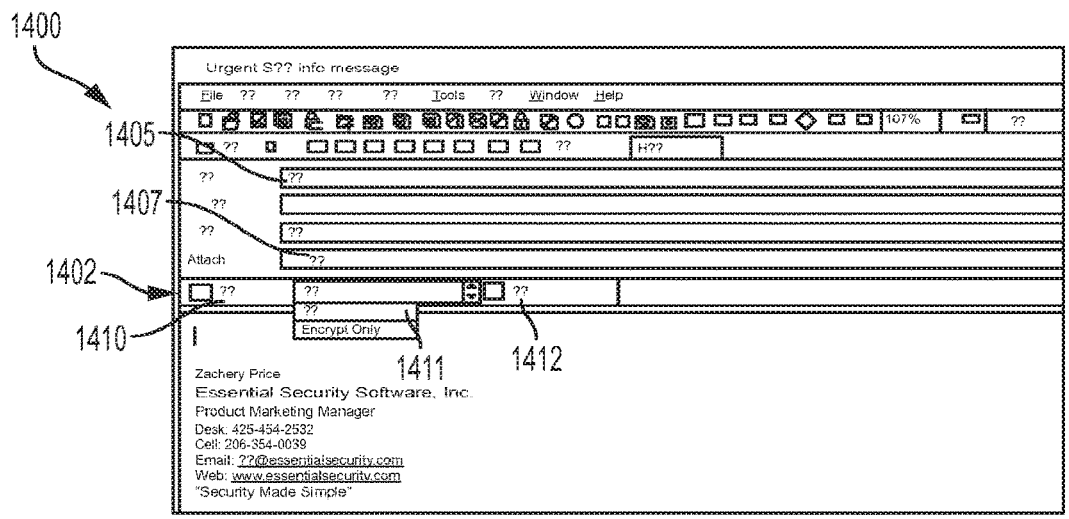
Figure 14B:
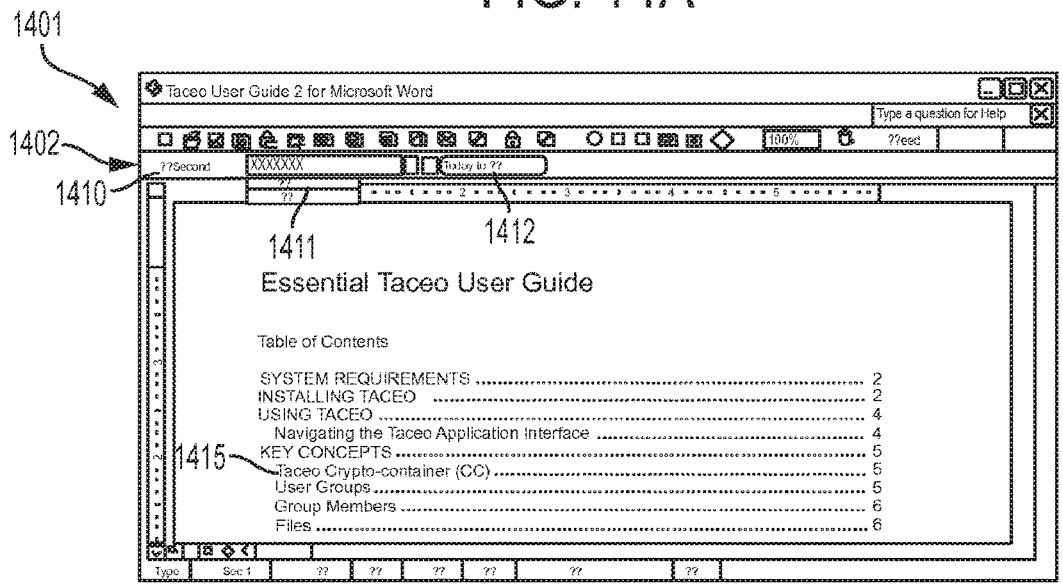

In another embodiment of the present invention, the functionality of the authoring tool may be adapted for a quick method for creating a cryptocontainer from within a host application. As illustrated in FIGS. 14A and 14B, an adapted version of the authoring tool is accessible via a user interface toolbar 1402. This toolbar automates the inclusion all of cryptocontainer data elements that are required for configuring the cryptocontainer to be accessible by authorized recipients. The cryptocontainer data elements from the toolbar comprise: email addresses of the intended recipients 1405, data files 1407, usage permissions 1411 and timeline settings 1412.

In FIG. 14A, one embodiment of the toolbar interface 1402 is shown as an add-in feature 1400 to a commercially available host e-mail client program (Outlook® by Microsoft Corp., Redmond, Wash.). The recipient list 1405 and data files 1407 are entered directly in the host application and are copied automatically by the toolbar interface 1402. A rights template 1411 may be selected along with the timeline settings 1412 for the selected rights. The process of creating and sending the cryptocontainer is executed by a single user command button 1410.

In FIG. 14B, an embodiment of the toolbar interface 1402 is shown as an add-in feature 1401 to a commercially available host document processing program (Word by Microsoft Corp., Redmond, Wash.). In this example, the toolbar interface 1402 assumes that the document 1415 being processed by the host application comprises the digital content to be sent. A rights template 1411 may be selected along with the timeline settings 1412 for the selected rights. The process of creating and sending the cryptocontainer is triggered by the user command button 1410. The recipient list may be entered into a dialog panel.

Figure 14C:
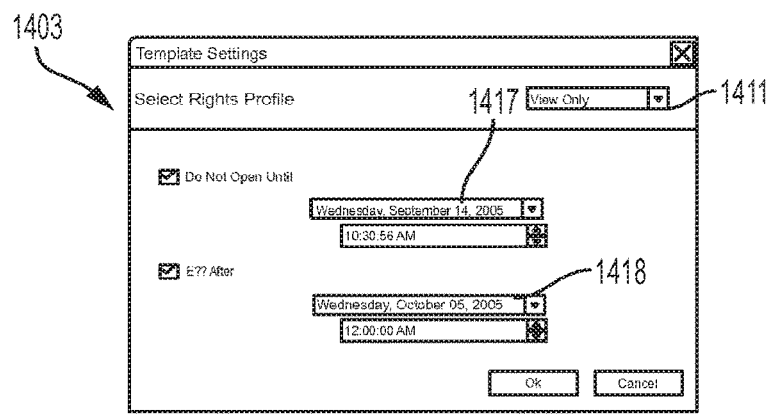

In FIG. 14C, a simplified timeline entry dialog 1403 is illustrated. The timeline 1412 is specified for a given rights profile 1411 and is stored with the rights profile 1411. The simplified timeline 1403 comprises three keyframes. The first keyframe 1417 is "Do Not Open Until" and represents the activation time for the data files in the cryptocontainer. The second keyframe is the viewing keyframe (not shown) between the first 1417 and third 1418 keyframes and represents the usage period by the recipient. The third keyframe 1418 is "Expire After" and represent the expiration date of the usage rights in the profile 1411.

The toolbar interface 1402 allows authors retrieve usage permissions from a pre-defined template. The process for generating a pre-defined template using the authoring tool (see FIGS. 14D-14F) is separate from the standard cryptocontainer creation process, as previously described above. An author may select a pre-defined rights profile template directly from a drop-down menu 1411 in the toolbar interface 1402. In one example, the toolbar interface 1402 comprises default rights templates for "View Only" and "Encrypt Only" access to the cryptocontainer.

The toolbar interface 1402 may exist as a plug-in to a host software application 1401 or to an e-mail client 1400 that provides for the addition of third party plug-ins. The toolbar interface 1402 may be used with a web mail e-mail client or with a locally installed e-mail client program. In one embodiment of the toolbar interface 1402, a single mouse click (on button 1410) may suffice for creating a cryptocontainer, for assigning access rights to documents sent with a cryptocontainer, and for sending a cryptocontainer within an e-mail application program. In another example, from host application programs such as document, spreadsheet or graphic applications, the author may be required to enter the e-mail addresses of the recipients before the cryptocontainer is created. In that case, the toolbar interface 1402 may assume that the author is attempting to send the current document 1415 being processed in the host application in a cryptocontainer. When the appropriate button 1410 on the toolbar interface is clicked, the required cryptocontainer elements are retrieved by the host application program that the toolbar interface 1402 resides in. In one example, a "Send secure" button 1410 represents the toolbar interface 1402 in a host application, as illustrated in FIGS. 14A and 14B. The source of the required cryptocontainer elements may comprise the following items:

1. E-Mail Client Host Applications 1400 a. Recipients list is gathered from the e-mail addresses 1405 entered in the "to:", "cc:", and "bcc:" fields;
b. Files are gathered from the "File Attachments" field 1407 and/or the email message body and are included in the cryptocontainer as separate files which can be assigned usage rights;
c. Usage permissions are gathered from the template chosen in the toolbar interface 1402 drop-down menu 1411; and
d. Timeline rights are gathered from time and date data entered into a dialog window 1403 by the author. The data elements provided are "Do not open until" and "Expires on". When complete these elements create 3 keyframes that will be applied to the cryptocontainer elements 1405, 1407.

2. Other Host Applications 1401 a. Recipients list is gathered from the e-mail addresses entered by the author from a prompted dialog window interface.
b. Files comprise the current document(s) 1415 that the author is processing in the host application. The author may be prompted to save the current document(s) 1415 before inclusion in the cryptocontainer.
c. Usage permissions are gathered from the template chosen in the toolbar drop-down menu 1411 by the author.
d. Timeline rights are gathered from time and date data 1412 entered into a dialog window by the author.

In one embodiment of the toolbar interface 1402, all recipients are included into the same User Group. Also, included files 1407, 1415 may be assigned usage rights according to the chosen template setting 1411 (i.e. View Only, Encrypt Only). Timeline rights 1412 may be assigned to any rights template 1411. In another example embodiment of the toolbar interface 1402, the creation of rights timeline templates 1411, wherein the times and dates of settings are relative to the date and time they are applied, may be specified and stored in advance. For example, an author may create a plurality of keyframes, each with a set of associated rights. When saved in advance as a template 1411, only the relative difference to an arbitrary start time for each starting and ending times of each keyframe is stored, thereby allowing authors to create complex usage scenarios that may be rapidly retrieved and reused on demand at any time in the future.

As basic examples of rights templates 1411, "View Only" and "Encrypt Only" may be pre-defined as default selections for rights templates 1411 in the toolbar interface 1402. The "View Only" template (see FIGS. 14D-14F) may have the following rights enabled: View, Item Visible and Show Thumbnails. The "Encrypt Only" template may have the following rights enabled: View, Item Visible, Show Thumbnails and Extract. In one example, the "Encrypt Only" template merely assures the safe transmission of the files between the sender (i.e. the author of the cryptocontainer) and the recipient, without applying further usage rights that are enforced by the viewing tool.

Figure 14D:
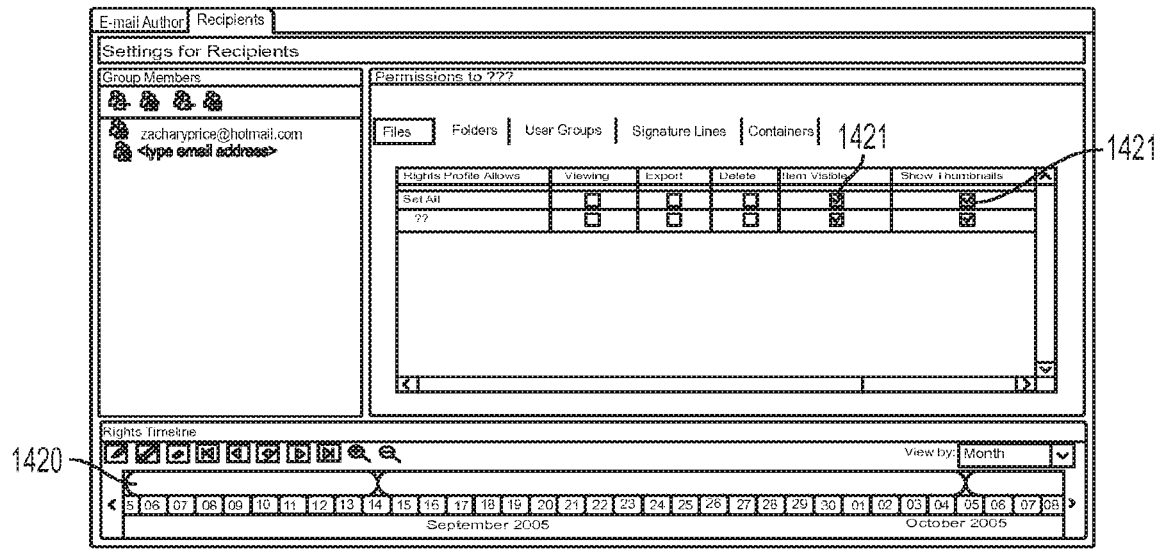
Figure 14E:
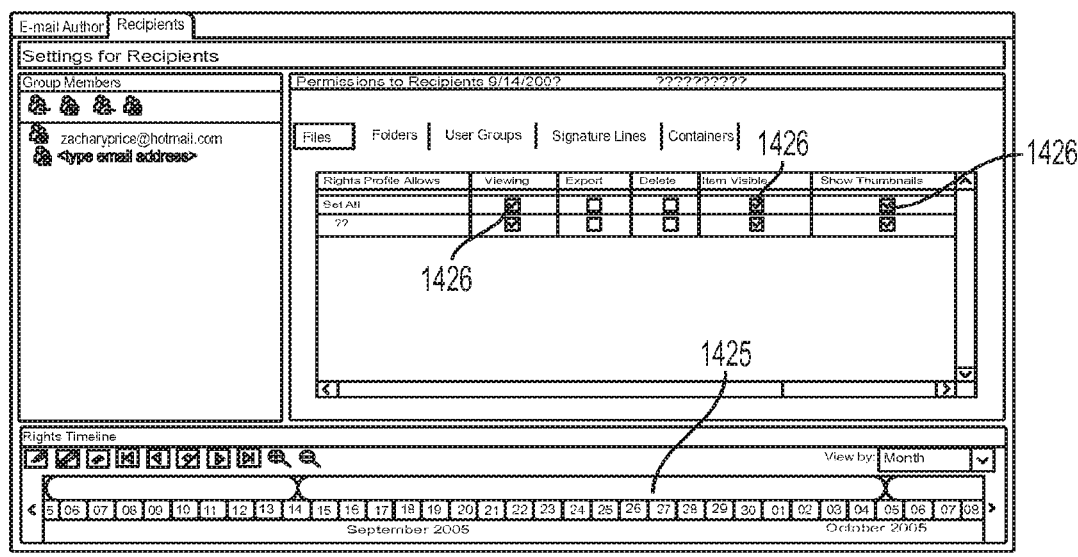
Figure 14F:
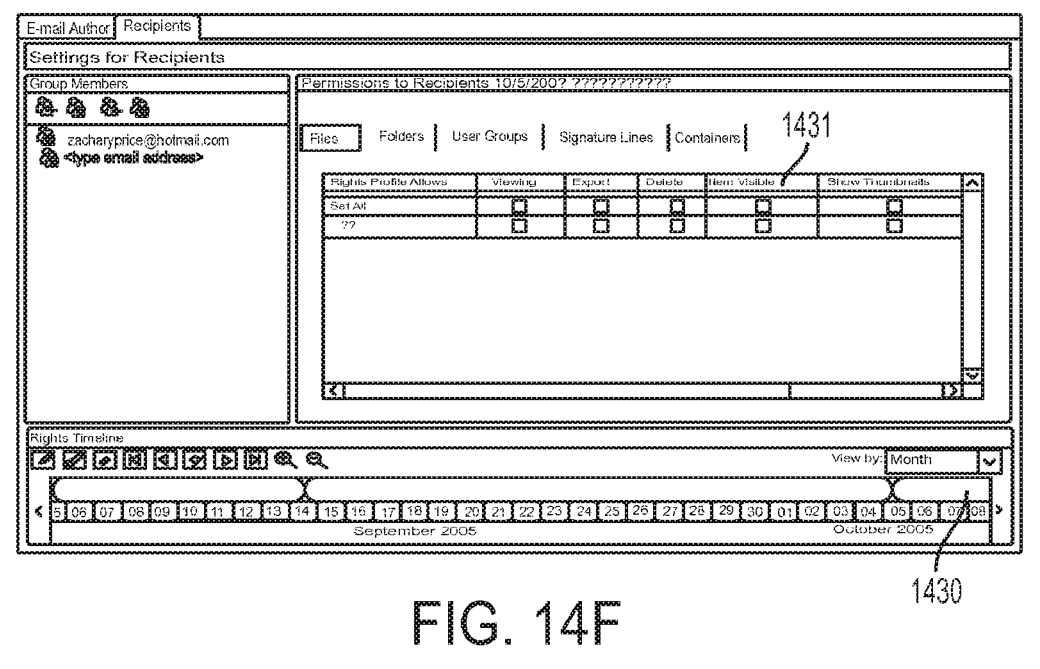

Users may additionally create new rights templates by operating the authoring tool and choosing a selected rights schema within the Usage Permissions window. In FIG. 14D, a template entry is illustrated for the "Do Not Open Until" keyframe 1417, 1420 (see FIG. 14C) in the "View Only" rights profile template 1411. As reflected in the first cryptocontainer keyframe 1417, 1420, Item Visible and Show Thumbnails are the only enabled rights 1421. In FIG. 14E, a template entry is illustrated for the viewing keyframe 1425 in the "View Only" rights profile template 1411. As reflected in the second cryptocontainer keyframe 1425, Item Visible, Show Thumbnails and Viewing are the only enabled rights 1426. In FIG. 14E, a template entry is illustrated for the "Expire After" keyframe 1418, 1430 (see FIG. 14C) in the "View Only" rights profile template 1411. As reflected in the third cryptocontainer keyframe 1418, 1430, Item Visible and Show Thumbnails are the only enabled rights 1431.

The author may then select the "Save as Template" command in the authoring tool, whereby the chosen rights schema will then be saved as a template that automatically populates the toolbar interface drop-down menu 1411. The rights template exists as a unique entity independent of the other cryptocontainer elements to which it will be applied. In one example embodiment of a rights template, an author may choose to create a template entitled "View & Print," which would allow recipients rights only for viewing and printing files in the cryptocontainer (but not, forwarding, editing, copying, etc.). Other templates may be created with any combination of user rights and timeline settings as required.

Although the present invention and its advantages have been described in detail, it should be understood that various changes, substitutions and alterations can be made herein without departing from the spirit and scope of the invention as defined by the appended claims.

What is claimed is:

1. A method comprising:
    receiving, by a server, sending platform information from a sending platform, wherein the sending platform comprises a sending platform application to send the sending platform information;
    validating the sending platform using the sending platform information, wherein, after the validating the sending platform, the sending platform encrypts, using the sending platform application, content into a cryptocontainer that is sent to a receiving platform;
    receiving, by the server, receiving platform information from the receiving platform, wherein the receiving platform comprises a receiving platform application; and
    validating the receiving platform using the receiving platform information by comparing, at the server, the receiving platform information to a recipient list associated with the cryptocontainer; and
    transmitting, to the receiving platform in response to comparing the receiving platform information to the recipient list, a set of keys configured to decrypt the cryptocontainer, wherein, after transmitting the set of keys, the receiving platform decrypts the cryptocontainer using the set of keys and accesses the content decrypted from the cryptocontainer in accordance with a set of usage rights that are associated with cryptocontainer and enforced by the receiving platform, wherein the set of usage rights define a usage rights timeline during which the content is accessible at the receiving platform.

2. The method of claim 1, wherein the sending platform information comprises a hardware fingerprint of the sending platform, and wherein the receiving platform information comprises a hardware fingerprint of the receiving platform.

3. The method of claim 1, wherein the sending platform application comprises an installation of a viewing tool, and wherein the receiving platform application comprises an installation of the viewing tool.

4. The method of claim 1, wherein, after validating the sending platform, the sending platform is further configured to encrypt the set of usage rights into the cryptocontainer.

5. The method of claim 1, wherein the set of usage rights are defined according to a keyframe that includes a set of predefined right states, wherein a right state of the set of predefined right states is enforceable by the receiving platform for a defined period of time according to the keyframe.

6. The method of claim 1, wherein at least one key of the set of keys is used to decrypt the usage rights timeline to be enforced by the receiving platform.

7. The method of claim 1, further comprising:
    receiving, at the server, an encrypted version of the recipient list; and
    decrypting, at the server, the encrypted version of the recipient list using a key associated with the server, wherein the server compares the receiving platform information to the recipient list in response to decrypting the encrypted version of the recipient list.

8. The method of claim 1, wherein, after validating the sending platform, the sending platform is further configured to encrypt an audit trail associated with the content into the cryptocontainer.

9. A system comprising:
    a processor;
    a memory;
    the memory comprising instructions executed by the processor and configured for:
        receiving, by the processor at a server, sending platform information from a sending platform, wherein the sending platform comprises a sending platform application to send the sending platform information;
        validating the sending platform using the sending platform information, wherein, after the validating the sending platform, the sending platform encrypts, using the sending platform application, content into a cryptocontainer that is sent to a receiving platform;
        receiving, by the processor, receiving platform information from the receiving platform, wherein the receiving platform comprises a receiving platform application; and validating the receiving platform using the receiving platform information by comparing, at a server, the receiving platform information to a recipient list associated with the cryptocontainer; and transmitting, to the receiving platform in response to comparing the receiving platform information to the recipient list, a set of keys configured to decrypt the cryptocontainer, wherein, after transmitting the set of keys, the receiving platform decrypts the cryptocontainer using the set of keys and accesses the content decrypted from the cryptocontainer in accordance with a set of usage rights that are associated with cryptocontainer and enforced by the receiving platform, wherein the set of usage rights define a usage rights timeline during which the content is accessible at the receiving platform.

10. The system of claim 9, wherein the sending platform information comprises a hardware fingerprint of the sending platform, and wherein the receiving platform information comprises a hardware fingerprint of the receiving platform.

11. The system of claim 9, wherein the sending platform application comprises an installation of a viewing tool, and wherein the receiving platform application comprises an installation of the viewing tool.

12. A non-transitory computer-readable storage medium storing instructions configured to execute on a processor, the instructions comprising functionality to perform:

receiving, by a server, sending platform information from a sending platform, \wherein the sending platform comprises a sending platform application to send the sending platform information;

validating the sending platform using the sending platform information, wherein, after the validating the sending platform, the sending platform encrypts, using the sending platform application, content into a cryptocontainer that is sent to a receiving platform;

validating the receiving platform using the receiving platform information by comparing, at the server, the receiving platform information to a recipient list associated with the cryptocontainer; and transmitting, to the receiving platform in response to comparing the receiving platform information to the recipient list, a set of keys configured to decrypt the cryptocontainer, wherein, after transmitting the set of keys, the receiving platform decrypts the cryptocontainer using the set of keys and accesses the content decrypted from the cryptocontainer in accordance with a set of usage rights that are associated with cryptocontainer and enforced by the receiving platform, wherein the set of usage rights define a usage rights timeline during which the content is accessible at the receiving platform.

13. The non-transitory computer-readable storage medium of claim 12, wherein the sending platform information comprises a hardware fingerprint of the sending platform, and wherein the receiving platform information comprises a hardware fingerprint of the receiving platform.

14. The non-transitory computer-readable storage medium of claim 12, wherein the sending platform application comprises an installation of a viewing tool, and wherein the receiving platform application comprises an installation of the viewing tool.

* * * * *